United States Patent
Wu et al.

(10) Patent No.: US 10,264,580 B2
(45) Date of Patent: Apr. 16, 2019

(54) HE SIG B COMMON FIELD FORMATS AND INDICATION

(71) Applicant: MEDIATEK INC., Hsinchu (TW)

(72) Inventors: Tianyu Wu, Fremont, CA (US);
Shengquan Hu, Cupertino, CA (US);
Jianhan Liu, San Jose, CA (US);
Thomas Edward Pare, Jr., Mountain View, CA (US)

(73) Assignee: MEDIATEK INC., Hsin-Chu (TW)

(*) Notice: Subject to any disclaimer, the term of this patent is extended or adjusted under 35 U.S.C. 154(b) by 88 days.

(21) Appl. No.: 15/259,008

(22) Filed: Sep. 7, 2016

(65) Prior Publication Data
US 2017/0070998 A1    Mar. 9, 2017

Related U.S. Application Data

(60) Provisional application No. 62/215,054, filed on Sep. 7, 2015.

(51) Int. Cl.
| | |
|---|---|
| *H04L 5/00* | (2006.01) |
| *H04W 72/04* | (2009.01) |
| *H04B 7/0452* | (2017.01) |

(52) U.S. Cl.
CPC ....... *H04W 72/0453* (2013.01); *H04L 5/0007* (2013.01); *H04L 5/0023* (2013.01);
(Continued)

(58) Field of Classification Search
CPC ... H04B 7/0452; H04L 5/0007; H04L 5/0053; H04L 5/0094; H04W 72/04; H04W 72/0453
See application file for complete search history.

(56) References Cited

U.S. PATENT DOCUMENTS

| | | |
|---|---|---|
| 6,839,025 B1 | 1/2005 | Reigle |
| 7,126,533 B2 | 10/2006 | Fiore et al. |
| | (Continued) | |

FOREIGN PATENT DOCUMENTS

| | | |
|---|---|---|
| CN | 102007747 | 4/2011 |
| CN | 102149192 | 8/2011 |
| | (Continued) | |

OTHER PUBLICATIONS

EPO, Search Report for the EP patent application 16187569.5 dated Jan. 23, 2017 (12 pages).

(Continued)

*Primary Examiner* — Kevin C. Harper

(57) ABSTRACT

Methods and apparatus are provided for HE-SIG-B common field formats and indications. In one novel aspect, a fixed format is used for HE-SIG-B common field indicating resource allocations (RA). In one embodiment, look-up tables (LUT) are configured for the resource allocation and indicated in the HE-SIG-B common field. In one embodiment, one or more RA LUTs are used based on the operation bandwidth. The RA LUTs are placed in an order of channel indexes from lower channel to upper channel signaled in each corresponding RA LUT. In another novel aspect, MU-MIMO is used for operation bandwidth of 160 MHz and a compression indicator is set in the HE-SIG-A field indicating a saving of all RA LUTS in the HE-SIG-B common field. In yet another novel aspect, a one-bit middle-tone indicator is included in the HE-SIG-B common field indicating whether the one or more middle 26 tone is used.

25 Claims, 9 Drawing Sheets

(52) U.S. Cl.
CPC .......... *H04L 5/0053* (2013.01); *H04L 5/0094* (2013.01); *H04B 7/0452* (2013.01)

(56) References Cited

U.S. PATENT DOCUMENTS

| | | | |
|---|---|---|---|
| 8,213,527 B2 | 7/2012 | Wang et al. | |
| 8,619,641 B2 | 12/2013 | Guo | |
| 8,879,993 B2 | 11/2014 | Palin et al. | |
| 8,929,192 B2 | 1/2015 | Kainulainen et al. | |
| 9,231,809 B2 | 1/2016 | Azizi et al. | |
| 9,331,883 B1 | 5/2016 | Schelstraete et al. | |
| 9,615,214 B2 | 4/2017 | Syrjarinne et al. | |
| 9,647,868 B2 | 5/2017 | Jiao et al. | |
| 9,739,878 B2 | 8/2017 | Gudim et al. | |
| 10,187,124 B2 | 1/2019 | Liu et al. | |
| 10,211,948 B2 | 2/2019 | Liu et al. | |
| 2001/0006540 A1 | 7/2001 | Kim et al. | |
| 2006/0158374 A1 | 7/2006 | Rahamin et al. | |
| 2008/0191941 A1 | 8/2008 | Saban et al. | |
| 2008/0232485 A1 | 9/2008 | Niu et al. | |
| 2009/0040998 A1 | 2/2009 | Park | |
| 2009/0122890 A1 | 5/2009 | Wu | |
| 2010/0246720 A1 | 9/2010 | Wang et al. | |
| 2011/0033004 A1 | 2/2011 | Wang et al. | |
| 2011/0193739 A1 | 8/2011 | Strauch et al. | |
| 2011/0243197 A1 | 10/2011 | Atarashi et al. | |
| 2011/0261858 A1 | 10/2011 | Baldemair et al. | |
| 2011/0274003 A1 | 11/2011 | Pare, Jr. et al. | |
| 2012/0256726 A1 | 10/2012 | Honkanen et al. | |
| 2012/0258669 A1 | 10/2012 | Honkanen et al. | |
| 2012/0263211 A1 | 10/2012 | Porat et al. | |
| 2013/0039200 A1 | 2/2013 | Park et al. | |
| 2013/0070701 A1 | 3/2013 | Merlin et al. | |
| 2013/0089121 A1 | 4/2013 | Koo et al. | |
| 2013/0121244 A1 | 5/2013 | Vermani et al. | |
| 2013/0136016 A1 | 5/2013 | Lee et al. | |
| 2013/0265907 A1 | 10/2013 | Kim et al. | |
| 2013/0321209 A1 | 12/2013 | Kalliola et al. | |
| 2013/0343211 A1 | 12/2013 | Liu et al. | |
| 2014/0070996 A1 | 3/2014 | Kneckt et al. | |
| 2014/0219449 A1 | 8/2014 | Shattil et al. | |
| 2014/0254648 A1 | 9/2014 | Van Nee | |
| 2014/0293983 A1 | 10/2014 | Amiri et al. | |
| 2014/0328335 A1 | 11/2014 | Zhang | |
| 2015/0009894 A1 | 1/2015 | Vermani et al. | |
| 2015/0023449 A1 | 1/2015 | Porat et al. | |
| 2015/0124739 A1 | 5/2015 | Baik et al. | |
| 2015/0139091 A1 | 5/2015 | Azizi et al. | |
| 2015/0139115 A1 | 5/2015 | Seok | |
| 2015/0230231 A1 | 8/2015 | Fornoles, Jr. | |
| 2015/0296516 A1 | 10/2015 | Jung | |
| 2015/0333885 A1 | 11/2015 | Athley | |
| 2016/0014763 A1 | 1/2016 | Jauh et al. | |
| 2016/0021568 A1 | 1/2016 | Yu et al. | |
| 2016/0033614 A1 | 2/2016 | Wang et al. | |
| 2016/0047885 A1 | 2/2016 | Wang et al. | |
| 2016/0065467 A1 | 3/2016 | Wu et al. | |
| 2016/0165598 A1 | 6/2016 | Azizi et al. | |
| 2016/0174200 A1* | 6/2016 | Seok | H04W 72/04 370/329 |
| 2016/0248542 A1 | 8/2016 | Liu et al. | |
| 2016/0249165 A1 | 8/2016 | Aldana | |
| 2016/0323060 A1 | 11/2016 | Hassanin et al. | |
| 2016/0330055 A1 | 11/2016 | Tong | |
| 2016/0352552 A1 | 12/2016 | Liu et al. | |
| 2016/0366548 A1 | 12/2016 | Wang et al. | |
| 2016/0370450 A1 | 12/2016 | Thorn et al. | |
| 2017/0048862 A1* | 2/2017 | Choi | H04L 5/0053 |
| 2017/0064718 A1 | 3/2017 | Bharadwaj et al. | |
| 2017/0070893 A1 | 3/2017 | Wang et al. | |
| 2017/0093546 A1 | 3/2017 | Wu et al. | |
| 2017/0099089 A1 | 4/2017 | Liu et al. | |
| 2017/0104553 A1 | 4/2017 | Liu et al. | |
| 2017/0134207 A1 | 5/2017 | Liu et al. | |
| 2017/0171363 A1 | 6/2017 | Sun et al. | |
| 2017/0171796 A1 | 6/2017 | Wu et al. | |
| 2017/0180177 A1 | 6/2017 | Wu et al. | |
| 2017/0181136 A1* | 6/2017 | Bharadwaj | H04B 7/0452 |
| 2017/0214507 A1 | 7/2017 | Kang et al. | |
| 2017/0215087 A1 | 7/2017 | Amizur et al. | |
| 2017/0230220 A1 | 8/2017 | Anwyl et al. | |
| 2017/0230981 A1 | 8/2017 | Ryu et al. | |
| 2018/0013527 A1 | 1/2018 | Sun et al. | |

FOREIGN PATENT DOCUMENTS

| | | |
|---|---|---|
| CN | 105939186 | 9/2016 |
| EP | 3098999 | 11/2016 |
| TW | I335034 | 12/2010 |
| TW | I474744 | 2/2015 |
| TW | I484777 | 5/2015 |
| TW | 201618501 A | 5/2016 |
| WO | 2004049498 | 6/2004 |
| WO | 2010022785 | 3/2010 |
| WO | 2015069811 | 5/2015 |
| WO | 2015077042 | 5/2015 |
| WO | WO2016178534 A1 | 5/2015 |
| WO | WO2017003229 A1 | 7/2015 |
| WO | WO2017027479 A1 | 8/2015 |
| WO | WO2017035235 A1 | 8/2015 |
| WO | 2016049216 | 3/2016 |
| WO | 2016/126034 A1 | 8/2016 |
| WO | 2016154350 | 9/2016 |

OTHER PUBLICATIONS

Robert Stacey, Intel, Specification Framework for TGax, IEEE P802.11 Wireless LANs, Jul. 2015 *p. 3, line 25-39*, *p. 4, line 1-5*, *sections 3.2.2, 3.2.3, 3.3.2, 4.1 *.
Young Hoon Kwon, Newracom, SIG Field Design Principle for 11ax, doc.: IEEE 802.11-15/0344r2, Mar. 2015 *slides 5-14*.
Joonsuk Kim, Apple, HE-SIG-B Structure, doc.: IEEE 802.11-15/0821r2, Jul. 2015 *slides 8-15*.
Katsuo Yunoki, KDDI R&D Laboratories, Considerations on HE-SIG-A/B, doc.: IEEE 802.11-15/827r2, Jul. 2015 *slides 2-11*.
EPO, Search Report for the EP patent application 16187569.5 dated Nov. 9, 2017 (6 pages).
Darryn Lowe et al., "Analysis and Evaluation of MB-OFDM Dual Carrier Modulation", Telecommunicatins Information Technology Research Institute, University of Wollongong.
EPO, Search Report for the EP Patent Application 15833049.8 dated Feb. 16, 2018 (9 Pages).
International Search Report and Written Opinion of International Search Authority for PCT/CN2015/087365 dated Nov. 24, 2015 (10 Pages).
EPO, Search Report for the EP Patent Application 16191047.6 dated Feb. 14, 2017 (7 Pages).
Tim Schmidt, "Clause 6 OFDM Phy Draft", Jan. 2010 IEEE P802.15-10-0013-00-004G, IEEE P802.15 Wireless Personal Area Networks, Progect IEEE P802.15 Working Group for Wireless Personal Area Networks (WPANS).
EPO, Search Report for the EP Patent Application 16193438.5 dated Mar. 17, 2017 (9 Pages).
EPO, Search Report for the EP Patent Application 16197315.1 dated Mar. 31, 2017 (8 Pages).
Robert Stacey, Intel, Specification Framework for TGAX, IEEE P802.11 Wireless LANS, Doc.: IEEE 802.11-15/0132R8, Sep. 2015. *Paragraph [3.2.4]*.
M. Rahaim et al., WIFE PHY Standards Review—From Early 802.11 to 'AC' and 'AD', MCL Technical Report No. Apr. 29, 2014.
Kaushik Josiam et al., HE-SIG-B Contents, Doc.: IEEE802.11-15/1066R0, Sep. 2015, *Slide 8* *Slides 10, 11* *Slide 17*.
Joonsuk Kim, et al., HE-SIG-B Structure, Doc.: IEEE 802.11-15/0821R2, Sep. 2015 *Slides 11-15*.

* cited by examiner

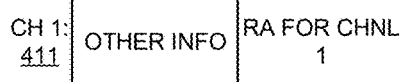
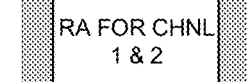
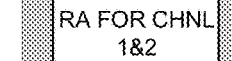
FIG. 4A                    FIG. 4B
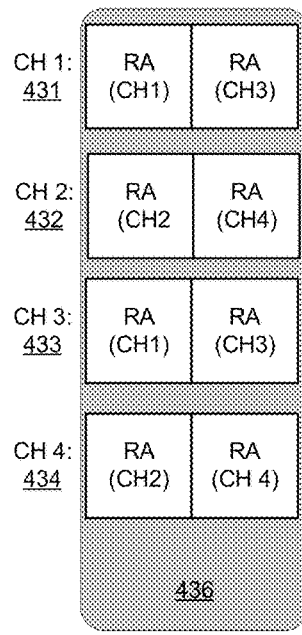
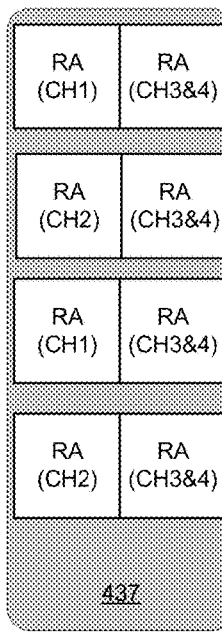
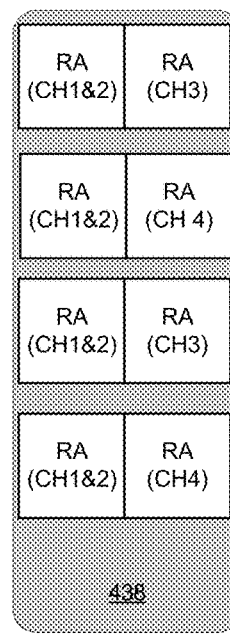
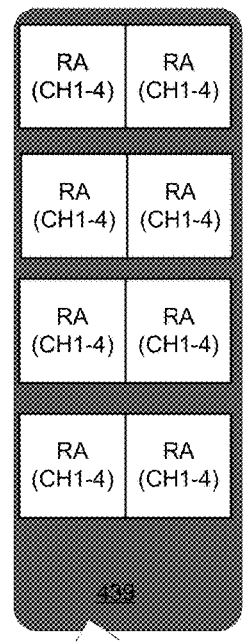
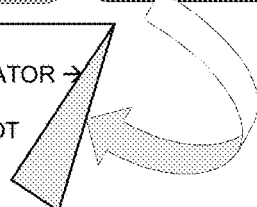
- MU-MIMO ONLY
- SIG-A FIELD: COMPRESSION INDICATOR → SET
- THE HE-SIG-B COMMON FIELD IS NOT SIGNALED
FIG. 4C

CH 1:
441
| RA (CH1) | RA (CH3) | RA (CH5) | RA (CH7) |

CH 2:
442
| RA (CH2) | RA (CH4) | RA (CH6) | RA (CH8) |

CH 3:
443
| RA (CH1) | RA (CH3) | RA (CH5) | RA (CH7) |

CH 4:
444
| RA (CH2) | RA (CH4) | RA (CH6) | RA (CH8) |

CH 5:
445
| RA (CH1) | RA (CH3) | RA (CH5) | RA (CH7) |

CH 6:
446
| RA (CH2) | RA (CH4) | RA (CH6) | RA (CH8) |

CH 7:
447
| RA (CH1) | RA (CH3) | RA (CH5) | RA (CH7) |

CH 8:
448
| RA (CH2) | RA (CH4) | RA (CH6) | RA (CH8) |

| RA (CH1-4) | RA (CH1-4) | RA (CH5&6) | RA (CH7) |
| RA (CH1-4) | RA (CH1-4) | RA (CH5&6) | RA (CH8) |

⋮ DUP ON OTHER CHANNEL

| RA (CH1-4) | RA (CH1-4) | RA (CH5-8) | RA (CH5-8) |
| RA (CH1-4) | RA (CH1-4) | RA (CH5-8) | RA (CH5-8) |

⋮ DUP ON OTHER CHANNEL

| RA (CH1-8) | RA (CH1-8) | RA (CH1-8) | RA (CH1-8) |
| RA (CH1-8) | RA (CH1-8) | RA (CH1-8) | RA (CH1-8) |

⋮ DUP ON OTHER CHANNEL

FIG. 4D

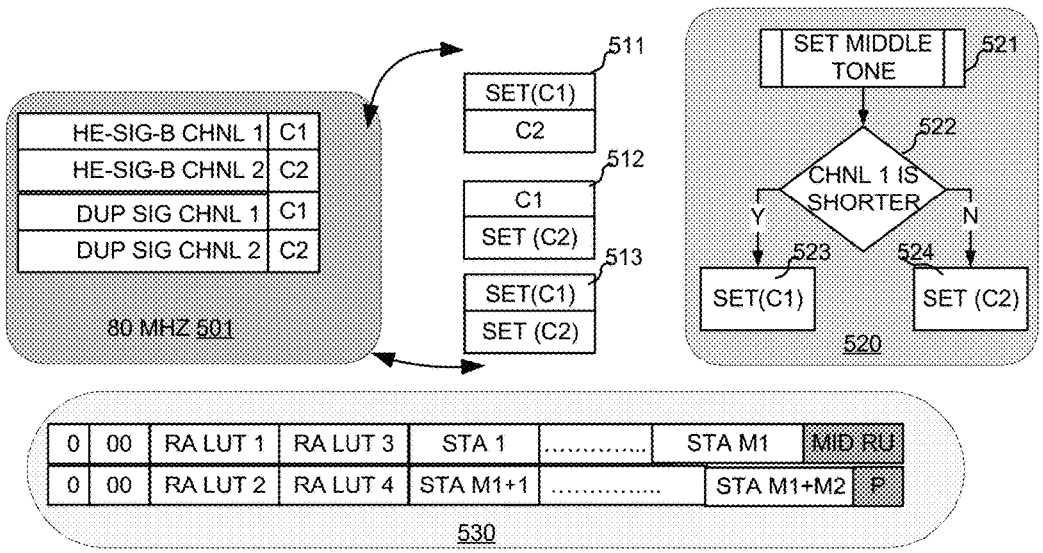
FIG. 5
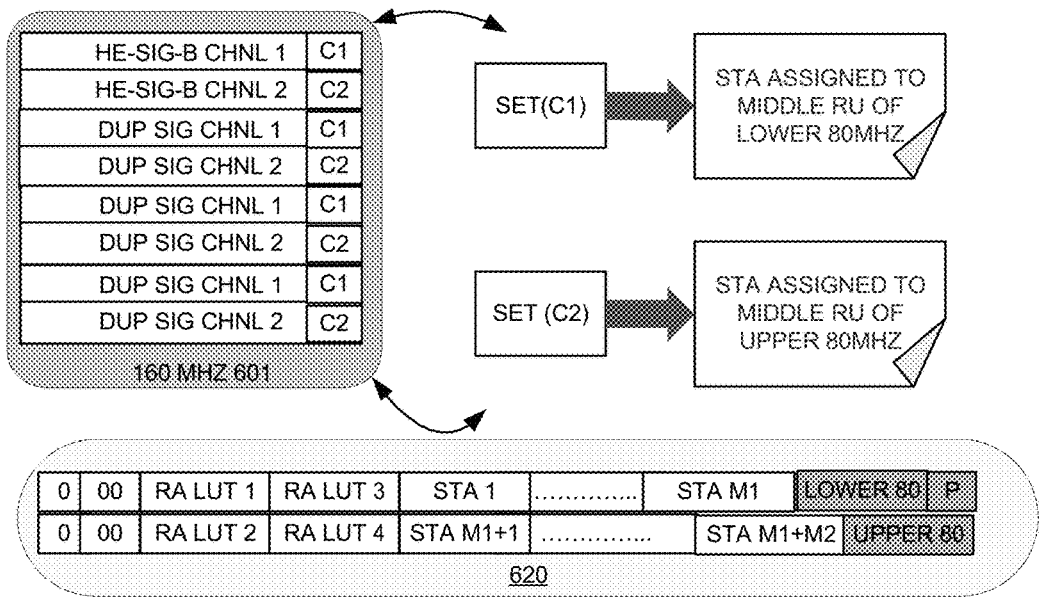
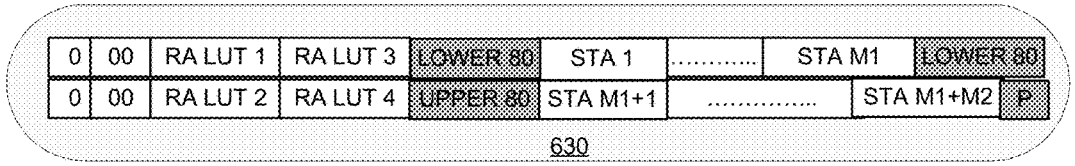
FIG. 6

| 00 | RA LUT 1 | RA LUT 3 | USER SPECIFC FILED | HE-SIG-B CH 1 |
| --- | --- | --- | --- | --- |
| 00 | RA LUT 2 | RA LUT 4 | USER SPECIFC FILED | HE-SIG-B CH 2 |

| 01 | RA LUT 1 | RA LUT3&4 | USER SPECIFC FILED | HE-SIG-B CH 1 |
| --- | --- | --- | --- | --- |
| 01 | RA LUT 2 | USER SPECIFC FILED | | HE-SIG-B CH 2 |

| 10 | RA LUT 3 | USER SPECIFC FILED | | HE-SIG-B CH 1 |
| --- | --- | --- | --- | --- |
| 10 | RA LUT 1&2 | RA LUT 4 | USER SPECIFC FILED | HE-SIG-B CH 2 |

| 10 | RA LUT 1&2 | USER SPECIFC FILED | HE-SIG-B CH 1 |
| --- | --- | --- | --- |
| 10 | RA LUT 3&4 | USER SPECIFC FILED | HE-SIG-B CH 2 |

FIG. 7

| 00 | RA LUT 1 | RA LUT 3 | RA LUT 5 | RA LUT 7 |
| --- | --- | --- | --- | --- |
| 00 | RA LUT 2 | RA LUT 4 | RA LUT 6 | RA LUT 8 |

| 00 | RA LUT 1 | RA LUT 3 | RA LUT 5 | RA LUT 7&8 |
| --- | --- | --- | --- | --- |
| 00 | RA LUT 2 | RA LUT 4 | RA LUT 6 | RA LUT 7&8 |

| 01 | RA LUT 1 | RA LUT 3&4 | RA LUT 5 |
| --- | --- | --- | --- |
| 01 | RA LUT 2 | RA LUT 6 | RA LUT 7&8 |

| 01 | RA LUT 1&2 | RA LUT 3 | RA LUT 7&8 |
| --- | --- | --- | --- |
| 01 | RA LUT 4 | RA LUT 5&6 | RA LUT 7&8 |

| 01 | RA LUT 1-4 | RA LUT 5 | RA LUT 7 |
| --- | --- | --- | --- |
| 01 | RA LUT 1-4 | RA LUT 6 | RA LUT 8 |

| 10 | RA LUT 1&2 | RA LUT 5&6 |
| --- | --- | --- |
| 10 | RA LUT 3&4 | RA LUT 7&8 |

| 10 | RA LUT 1 | RA LUT 3&4 |
| --- | --- | --- |
| 10 | RA LUT 2 | RA LUT 5-8 |

| 10 | RA LUT 1-4 | RA LUT 5&6 |
| --- | --- | --- |
| 10 | RA LUT 1-4 | RA LUT 7&8 |

| 11 | RA LUT 1-4 |
| --- | --- |
| 11 | RA LUT 5-8 |

| 11 | RA LUT 1-8 |
| --- | --- |
| 11 | RA LUT 1-8 |

FIG. 8

| 0 | RA LUT 1 | RA LUT 3 | USER SPECIFC FILED |
|---|---|---|---|
| 0 | RA LUT 2 | RA LUT 4 | USER SPECIFC FILED |

| 0 | RA LUT 1 | RA LUT3&4 | USER SPECIFC FILED |
|---|---|---|---|
| 0 | RA LUT 2 | RA LUT3&4 | USER SPECIFC FILED |

| 0 | RA LUT 1&2 | RA LUT 3 | USER SPECIFC FILED |
|---|---|---|---|
| 0 | RA LUT 1&2 | RA LUT 4 | USER SPECIFC FILED |

| 1 | RA LUT 1&2 | USER SPECIFC FILED |
|---|---|---|
| 1 | RA LUT3&4 | USER SPECIFC FILED |

FIG. 9

| 0 | RA LUT 1 | RA LUT 3&4 | RA LUT 5 | RA LUT 7&8 |
|---|---|---|---|---|
| 0 | RA LUT 2 | RA LUT 3&4 | RA LUT 6 | RA LUT 7&8 |

| 1 | RA LUT 1-4 |
|---|---|
| 1 | RA LUT 5-8 |

| 1 | RA LUT 1-4 | RA LUT 5-8 |
|---|---|---|
| 1 | RA LUT 1-4 | RA LUT 5-8 |

| 1 | RA LUT 1-8 | RA LUT 1-8 |
|---|---|---|
| 1 | RA LUT 1-8 | RA LUT 1-8 |

FIG. 10

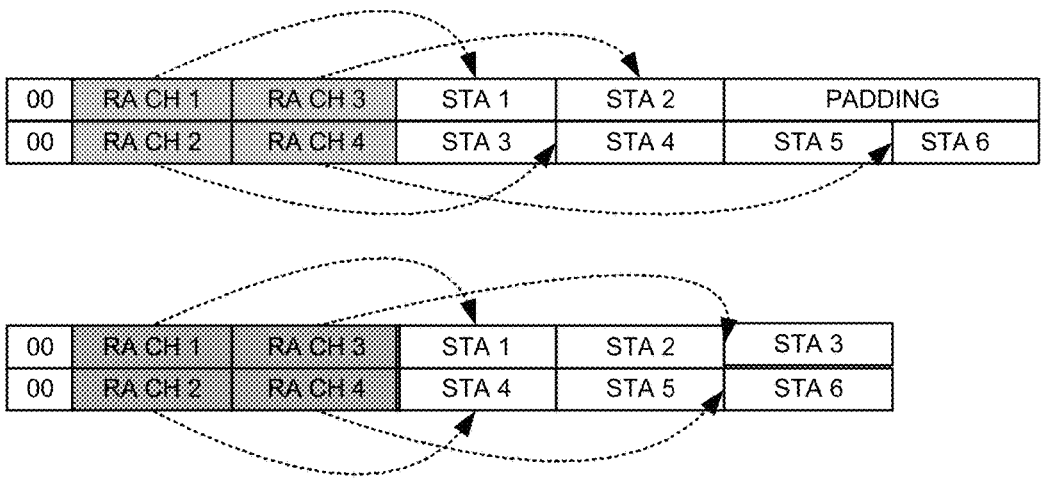

HE SIG B COMMON FIELD FORMATS AND INDICATION

CROSS REFERENCE TO RELATED APPLICATIONS

This application claims priority under 35 U.S.C. § 119 from U.S. Provisional Application No. 62/215,054, entitled "HE SIG B common field formats and indication," filed on Sep. 7, 2015, the subject matter of which is incorporated by reference.

TECHNICAL FIELD

The disclosed embodiments relate generally to wireless network communications, and, HE-SIG-B common field formats and indication.

BACKGROUND

As the demand for wireless communication continues to increase, the world has benefited from the evolution of the IEEE 802.11 wireless networking standard to accommodating more and more users with their ever-increasing data usage. The latest 802.11ax will enable high efficiency (HE) network. It is designed to handle higher data rate and higher user load. The system uses Orthogonal Frequency Division Multiple Access (OFDMA) as well as multi-user multiple-input and multiple-output (MU-MIMO).

Further different operation bandwidth can be supported and configured. The operation bandwidth is partitioned according to a predefined standard. In 11ax, resource allocation (RA) needs to be indicated to support OFDMA and/or MU-MIMO. The resource allocation will be signaled in the common part of the HE-SIG-B field. The structure of the HE-SIG-B is defined. However, how to use the HE-SIG-B field for efficient resource allocation is desired.

SUMMARY

Methods and apparatus are provided for HE-SIG-B (also known as HE SIG B) common field formats and indications. In one novel aspect, a fixed format is used for HE-SIG-B common field indicating resource allocations (RA). The STA obtains resource allocation (RA) information in an OFDMA wireless network, wherein the RA information is indicated in a HE-SIG-B common field, and wherein the HE-SIG-B common field for RA is with a fixed format. The STA determines an operation bandwidth, wherein the operation bandwidth is partitioned into predefined resource units, and wherein different operation bandwidth is partitioned into one or more HE-SIG-B channels, and wherein each HE-SIG-B channel represents a 20 MHz resource block. The STA determines a resource allocation using a RA look-up table (LUT) based on the RA information. In one embodiment, look-up tables (LUTs) are configured for the resource allocation and indicated in the HE-SIG-B common field. In another embodiment, the HE-SIG-B common field is defined with the fixed format of one RA LUT for 20 MHz operation bandwidth, one RA LUT on each HE-SIB-B channels for 40 MHz operation bandwidth with two HE-SIG-B channels, two RA LUTs on each HE-SIG-B common field for 80 MHz operation bandwidth with four HE-SIG-B channels, and four RA LUTs on each HE-SIG-B common field for 160 MHz operation bandwidth with eight HE-SIG-B channels, and wherein in each HE-SIG-B common field, the RA LUTs are placed in an order of channel indexes signaled in each corresponding RA LUT. In yet another embodiment, the operation bandwidth is greater than 20 MHz, and wherein each odd-numbered HE-SIB-B channel common field is a duplicate of each other containing a first set RU LUTs and each even-numbered HE-SIB-B channel common field is a duplicate of each other containing a second set RU LUTs. In one embodiment, one or more RA LUTs are used based on the operation bandwidth. The RA LUTs are placed in an order of channel indexes from lower channel to upper channel signaled in each corresponding RA LUT.

In another novel aspect, MU-MIMO is used and a compression indicator is set in the HE-SIG-A field indicating a saving of all RA LUTS in the HE-SIG-B common field. Upon detecting the set of the indicator, the HE-SIG-B common field is compressed.

In yet another novel aspect, a one-bit middle-tone indicator is included in the HE-SIG-B common field indicating whether the one or more middle 26 tone is used. In one embodiment, the operation bandwidth is 80 MHz and the middle-tone indicator is included at a fixed HE-SIG-B channel. In another embodiment, the operation bandwidth is 80 MHz and the middle-tone indicator is included at an allocated HE-SIG-B channel based on a load balance decision for the HE-SIG-B channels. In yet another embodiment, the operation bandwidth is 160 MHz, and wherein the middle-tone indicator for RUs of lower 80 MHz is placed at an end of HE-SIG-B channel-1 and the middle-tone indicator for RUs of upper 80 MHz is placed at an end of HE-SIG-B channel-2.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4A shows exemplary block diagrams of HE-SIG-B common field with fixed format for resource allocation of 20 MHz operation bandwidth in accordance with embodiments of the current invention.

FIG. 4B shows exemplary block diagrams of HE-SIG-B common field with fixed format for resource allocation of 40 MHz operation bandwidth in accordance with embodiments of the current invention.

FIG. 4C shows exemplary block diagrams of HE-SIG-B common field with fixed format for resource allocation of 80 MHz operation bandwidth in accordance with embodiments of the current invention.

FIG. 4D shows exemplary block diagrams of HE-SIG-B common field with fixed format for resource allocation of 160 MHz operation bandwidth in accordance with embodiments of the current invention.

FIG. 5 shows an exemplary diagrams of indication of middle 26-tone RU for 80 MHz bandwidth in accordance with embodiments of the current invention.

FIG. 6 shows an exemplary diagrams of indication of middle 26-tone RU for 160 MHz bandwidth in accordance with embodiments of the current invention.

FIG. 7 shows an exemplary diagram of using two bits format indication for 80 MHz operation bandwidth in accordance with embodiments of the current invention.

FIG. 8 illustrates an exemplary block diagram of using two bits format indication for 160 MHz operation BW in accordance with embodiments of the current invention.

FIG. 9 illustrates an exemplary block diagram of using one-bit format indication for 80 MHz operation BW in accordance with embodiments of the current invention.

FIG. 10 illustrates an exemplary block diagram of using one-bit format indication for 160 MHz operation BW in accordance with embodiments of the current invention.

FIG. 11 illustrates an exemplary block diagram for flexible resource allocation (FRA) by adding a few bits for each RA LUT in accordance with embodiments of the current invention.

FIG. 12 illustrates an exemplary block diagram for flexible resource allocation (FRA) by allowing placing the user specific field of a STA on different channel from the RA LUT signaling it in accordance with embodiments of the current invention.

FIG. 13 illustrates an exemplary block diagram of using one-bit FRA indication in HE-SIG-A to enable/disable the flexible resource-allocation signaling feature in accordance with embodiments of the current invention.

DETAILED DESCRIPTION

Reference will now be made in detail to some embodiments of the invention, examples of which are illustrated in the accompanying drawings.

Figure 1:
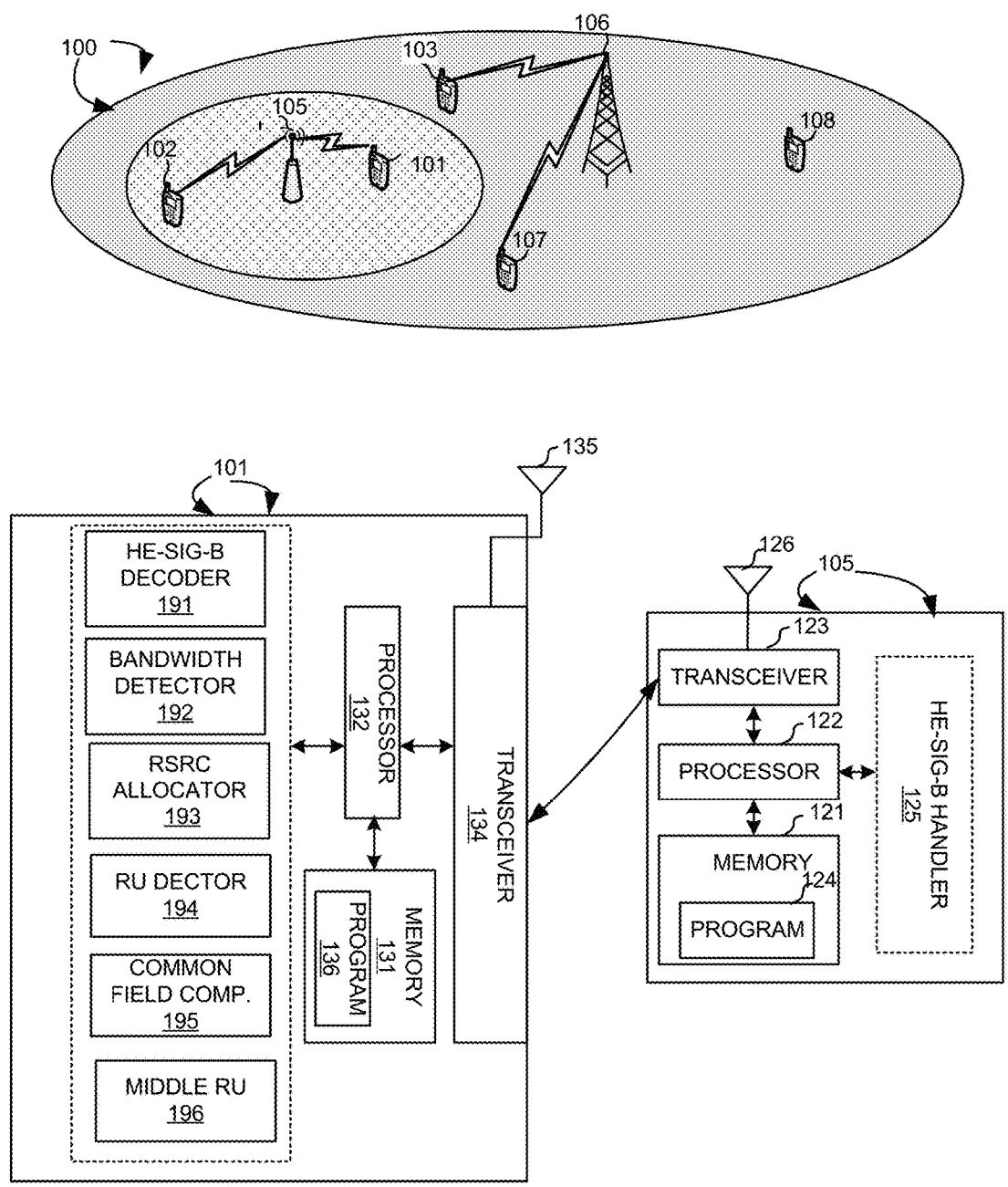
FIG. 1 illustrates an exemplary wireless communication network 100 with station (STA) supports 802.11ax in accordance with embodiments of the current invention.

FIG. 1 illustrates an exemplary wireless communication network 100 with station (STA) supports 802.11ax in accordance with embodiments of the current invention. Wireless communications system 100 includes one or more wireless networks, and each of the wireless communication networks has fixed base infrastructure units, such as wireless communications stations 105 and 106. The base unit may also be referred to as an access point, an access terminal, a base station, or by other terminology used in the art. Each of the wireless communications stations 105 and 106 serves a geographic area. The geographic area served by wireless communications stations 105 and 106 overlaps.

Wireless mobile station or stationstation (STA) 101 and 102 in the wireless network 100 are served by base station 105. STA 101, 102 and base station 105 supports 802.11ax. Other wireless communications device, such as wireless communication devices 103, 107 and 108, are served by a different base station 106. Base station 106 may support different wireless standard such as LTE, or may also support 802.11ax. STA 101 and 102 send uplink data to base stations 105 and 106 via uplink channels in the time and/or frequency domain. STA 101 and 102 receives downlink data from base stations 105 and 106 via downlink channels.

In one embodiment, the communication system utilizes Orthogonal Frequency Division Multiple Access (OFDMA). Wireless network 100 also supports MU-MIMO. The radio resources are portioned into resource blocks for multiple users.

FIG. 1 further shows simplified block diagrams of wireless stations 101 and base station 102 in accordance with the current invention.

Base station 102 has an antenna 126, which transmits and receives radio signals. A RF transceiver module 123, coupled with the antenna, receives RF signals from antenna 126, converts them to baseband signals and sends them to processor 122. Please note the antenna here can refer to one single antenna or a set of multiple antennas. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 105. Base station 105 also includes a set of control modules, such as HE-SIG-B handler 125, which carries out functional tasks for HE-SIG-B functions and communicates with the STA 101 for resource allocation related tasks.

STA 101 has an antenna 135, which transmits and receives radio signals. Please note the antenna here can refer to one single antenna or a set of multiple antennas. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

STA 101 also includes a set of control modules that carry out functional tasks. A HE-SIG-B decoding circuit 191 obtains resource allocation (RA) information in an OFDMA wireless network, wherein the RA information is indicated in a HE-SIG-B common field, and wherein the HE-SIG-B common field for RA is with a fixed format. A bandwidth detection circuit 192 determines an operation bandwidth, wherein the operation bandwidth is partitioned into predefined resource units, and wherein different operation bandwidth is partitioned into one or more HE-SIG-B channels, and wherein each HE-SIG-B channel represents a 20 MHz resource block. A resource allocation circuit 193 determines a resource allocation using a RA look-up table (LUT) based on the RA information. A RU detection circuit 194 determines a resource unit (RU) size scheduled for the STA such that the resource allocation circuit determines the resource allocation further based on the size of the RU. A common field compressing circuit 195 compresses the HE-SIG-B common field for full BW MU-MIMO packets. A middle RU handling circuit 196 determines the existence of user specific field for middle 26 tone RU of an 80 Mhz channel.

Figure 2:
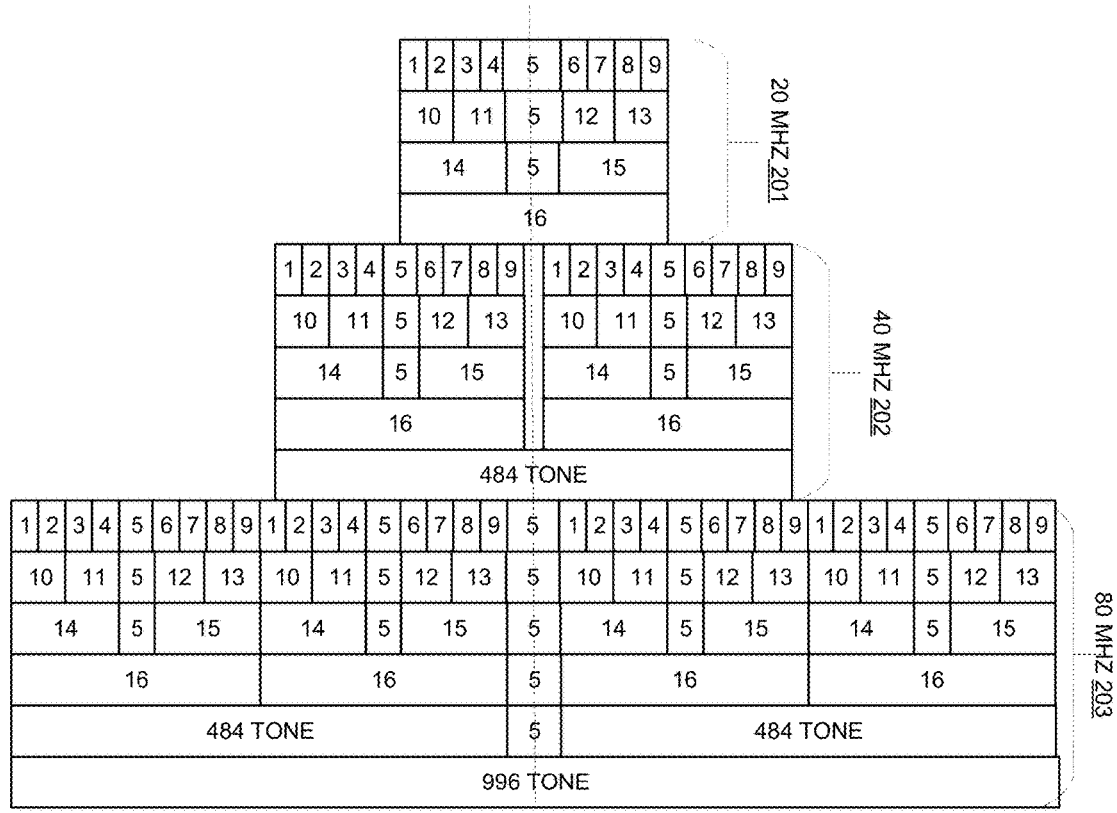
FIG. 2 shows an exemplary diagram of resource unit partition in the 802.11ax system in accordance with embodiments of the current invention.

FIG. 2 shows an exemplary diagram of resource unit partition in the 802.11ax system in accordance with embodiments of the current invention. In one embodiment, the resource allocation is based on the operation bandwidth as configured/defined as shown. A 20 MHz partition block diagram 201 shows the resource unit allocation for the 20 MHz bandwidth. The 20 MHz can be partitioned in nine 26-tone resource units, five 52-tone resource units, two 106-tone resource units and a 52-tone mid-tone unit, and one 242-tone unit. For a 40-Mhz bandwidth resource block, the resource units are partitions in two 20-Mhz partitions, with a channel-1 and channel-2. A 40-Mhz partition block diagram 202 shows the resource unit allocation for the 40 MHz bandwidth. The 40 MHz can be partitioned in two sets of nine 26-tone resource units, two sets of five 52-tone resource units, two sets of 106-tone resource unit with two sets of 26-tone mid-tone units, two 242-tone units, and one 484-tone resource unit. For an 80 Mhz bandwidth resource block, the resource units are partitions in two 40 Mhz partitions, with a channel-1 and channel-2. An 80 Mhz partition block diagram 203 shows the resource unit allocation for the 80 MHz bandwidth. The 80 MHz can be partitioned in four sets of nine 26-tone resource units with two 26-tone mid-tone RUs, four sets of five 52-tone resource units with two 26-tone mid-tone RUs, four sets of 106-tone resource units, two sets of 26-tone mid-tone unit, two sets of two 242-tone units with two 26-tone mid-tone RUs, two 484-tone resource unit with two 26-tone mid-tone RUs, and a 996-tone resource unit.

Figure 3:
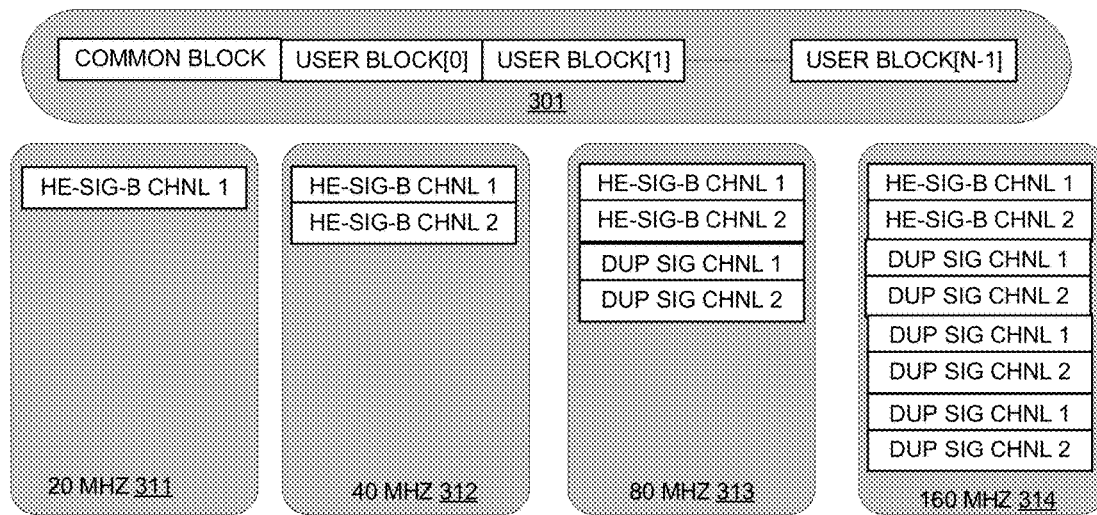
FIG. 3 shows exemplary diagrams of SIB-B structure and SIG-B channel partitions for different bandwidth in accordance with embodiments of the current invention.

FIG. 3 shows exemplary diagrams of SIG-B structure and HE-SIG-B channel partitions for different bandwidth in accordance with embodiments of the current invention. A HE-SIG-B structural diagram 301 shows an exemplary HE-SIG-B structure. HE-SIG-B structural diagram 301 includes a common block, multiple user blocks including user-block [0], user-block[1], other user blocks and user-block[N]. In one novel aspect, RA information is carried in the common block of HE-SIG-B 301. Different bandwidth configuration results in different number of HE-SIG-B channels. 20-MHz resource blocks 311 use one HE-SIG-B channel-1. 40-MHz resource block 312 uses two HE-SIG-B channels, HE-SIG-B Channel-1 and HE-SIG-B Channel-2. 80-MHz resource block 313 uses four HE-SIG-B channels, HE-SIG-B Channel-1, HE-SIG-B Channel-2 and one set of duplicated Channel-1 and Channel-2. 160-MHz resource block 313 uses eight HE-SIG-B channels, HE-SIG-B Channel-1, HE-SIG-B Channel-2 and three sets of duplicated Channel-1 and Channel-2. The RU indexes in the HE-SIG-B common field are used for a look-up table (LUT) to obtain the resource allocation information. To better support of MU-MIMO on OFDMA, the RU indexing is extended. The corresponding LUT reflects MU-MIMO configuration. In one novel aspect, a fixed format common field in the HE-SIG-B is defined for each operation bandwidth. Therefore, the length and the format of the common field are predefined. In this approach, there is no indication needed in the HE-SIG-A.

FIG. 4A shows exemplary block diagrams of HE-SIG-B common field with fixed format for resource allocation of 20 MHz operation bandwidth in accordance with embodiments of the current invention. For 20 MHz operation bandwidth there is one RA LUT on the HE-SIG-B common field. A Ch-1 211 includes fields for other information and RA for Ch-1. The other information in common field may include GI length for payload, LTF symbol length, and other field. These information bits have fixed length and format for all cases. The other information field is skipped for other operation bandwidth. The 20 MHz includes one channel. It means the RA LUT is signaling RU size smaller than or equals to 242-tone.

FIG. 4B shows exemplary block diagrams of HE-SIG-B common field with fixed format for resource allocation of 40 MHz operation bandwidth in accordance with embodiments of the current invention. For 40 MHz operation bandwidth there is one RA LUT on each HE-SIG-B common field. There are two different partitions for 40 MHz common field. For Ch-1 221 it can have RA for Ch-1, or RA for CH-1 & Ch-2. For Ch-2 222 it can have RA for Ch-2, or RA for CH-1 & Ch-2. To keep the HE-SIG-B common field with fixed format and length, the 484-tone RA LUT needs to be duplicated on two common fields of HE-SIG-B ch-1 and ch-2. The RA for two channels as shown here means the RA LUT signals the 484-tone RU. Similarly, RA for four channels means the RA LUT signals 996-tone RU. Format for user specific fields (USF): The RA LUT and the USFs for the STAs scheduled in the RA LUT are placed on the same HE-SIG-B channel. The USFs need to be placed in the order of their position in the RA LUT. The USF sets for STAs scheduled in different RA LUTs need to be placed in the same order of the RA LUTs.

FIG. 4C shows exemplary block diagrams of HE-SIG-B common field with fixed format for resource allocation of 80 MHz operation bandwidth in accordance with embodiments of the current invention. For 80 Mhz operation bandwidth, there are two RA LUTs on each of the HE-SIG-B common field and includes four HE-SIG-B channels, Ch-1 431, CH-2 432, Ch-3 433 and Ch-4 434. FIG. 4C shows four sets of formats. In 436, Ch-1 has RA for channel-1 and RA for channel-3. Ch2 has RA for channel-2 and RA for channel-4. Ch-3 is a duplicate as Ch-1, while Ch-4 is a duplicate of Ch-2. In 437, Ch-1 has RA for Ch-1&2, RA for Ch-3. Ch-2 has RA—for Ch-1&2 and RA for Ch-3. Ch-3 and Ch-4 are duplicates of Ch-1 and Ch-2, respectively. In 437 partition, Ch-1 has RA for Ch-1, and RA for Ch-3&4. Ch-2 has Ch-2, and RA for Ch-3&4. Ch-3 and Ch-4 are duplicates of Ch-1 and Ch-2, respectively. In 438, Ch-1 has RA for Ch-1&2, and RA for Ch-3. Ch-2 has Ch-1&2, and RA for Ch-4. Ch-3 and Ch-4 are duplicates of Ch-1 and Ch-2, respectively. In 439, Ch-1 through Ch-4 has Ch-1 through Ch-4.

In one novel aspect, in the configuration of 439, it is the MU-MIMO only case. For full BW MU-MIMO packets, an alternative signaling method is used. A one-bit compression indicator is set in the HE-SIG-A indicating the compress of the HE-SIG-B field. The entire RU LUTs in HE-SIG-B common field is saved.

FIG. 4D shows exemplary block diagrams of HE-SIG-B common field with fixed format for resource allocation of 160 MHz operation bandwidth in accordance with embodiments of the current invention. Similarly, to other operation bandwidth, 160 MHz there are four RA LUTs on each HE-SIG-B common field. As an example, in one configuration, Ch-1 has RA for Ch-1, RA for Ch-3, RA for Ch-5, and RA for Ch-7. Ch-2 has for Ch-2, RA for Ch-4, RA for Ch-6, and RA for Ch-8. Ch-3 and Ch-4 are duplicates of Ch-1 and Ch-2, respectively. So are Ch-5 and Ch-6 are duplicates of Ch-1 and Ch-2, respectively. And Ch-7 and Ch-8 are duplicates of Ch-1 and Ch-2, respectively. Other combinations of RA are available to 160 MHz as shown in FIG. 4D.

Several rules are defined for the HE-SIG-B common field formatting. First, for STAs scheduled on RU size smaller than or equals to 242-tone, the RA LUT shall be found on the 20 MHz channel that contains the scheduled RU for data. Second, for STAs scheduled on 484 tone RU, the RA LUT shall be duplicated on common fields. Third, for STAs scheduled on 996 tone RU, the RA LUT shall be duplicated twice on all common fields. Fourth, on each common field, RA LUTs need to be placed in order. For example in the order of channel index signaled in the RA LUT, from lower channel to upper channel.

In another novel aspect, the middle 26-tone RU for 80 MHz and 160 MHz can be signaled by the common field. A one-bit indication in the HE-SIG-B common filed. If operation BW is 80 MHz, define 1-bit in the common field to indicate whether the middle 26-tone RU is used. This bit duplicates on common field-1 and field-2. If operation BW is 160 Mhz, define 1-bit in the SIG-B channel-1 common field to indicate lower RU, and 1-bit in the SIG-B channel-2 common field to indicate the upper 26-tone RU. FIG. 5 and FIG. 6 illustrate the indication of the middle 26-tone RU.

FIG. 5 shows an exemplary diagrams of indication of middle 26-tone RU for 80 MHz bandwidth in accordance with embodiments of the current invention. An 80 MHz HE-SIG-B channel 501 includes a HE-SIG-B Ch-1, a HE-SIG-B Ch-2, a HE-SIG-B Duplicated Ch-1, and a HE-SIG-B Duplicated Ch-2. A one-bit in the common field of HE-SIG-B is used to indicate whether the middle 26-tone RU is used. If the bit is set, it indicates the RU is used. In one embodiment as shown in 511, one-bit in ch-1 of the HE-SIG-B common field is defined to be the middle 26-tone indicator. In a second embodiment as shown in 512, one-bit in ch-2 of the HE-SIG-B common field is defined to be the middle 26-tone indicator. In a third embodiment as shown in 513, duplicated bits are set in both ch-1 and ch-2. In the above three embodiments, the bit used as the middle 26-tone indicator is fixed. In a fourth embodiment as shown in 520, a load balance method is used. At step 521, it is decided to set the middle 26-tone indicator. At step 522, it determines whether ch-1 is a shorter HE-SIG-B. If yes, it moves to step 523 and use one-bit of ch-1 as the middle 26-tone indicator. If no, it moves step 524, and use one-bit of ch-2 as the middle 26-tone indicator.

In another embodiment, one user specific field is defined for the middle 26-tone RU of the 80 MHz. A bit structure 530 illustrates the middle 26-tone RU of the 80 MHz in fixed position of the user specific field. If no STA assigned on the middle RU, define the user specific field for a virtual STA (use a special AID or unallocated AID).

FIG. 6 shows an exemplary diagrams of indication of middle 26-tone RU for 160 MHz bandwidth in accordance with embodiments of the current invention. One 160 MHz HE-SIG-B channel 601 includes a HE-SIG-B Ch-1, a HE-SIG-B Ch-2, and three sets of a HE-SIG-B Duplicated Ch-1, and a HE-SIG-B Duplicated Ch-2. A one-bit in the common field of HE-SIG-B is used to indicate whether the middle 26-tone RU is used. If the bit is set, it indicates the RU is used. In one embodiment, one-bit in ch-1 of the HE-SIG-B common field is defined to be the middle 26-tone indicator for the middle 26-tone RU of the lower 80 MHz. One-bit in ch-2 of the HE-SIG-B common field is defined to be the middle 26-tone indicator for the middle 26-tone RU of the upper 80 MHz.

In another embodiment, two user specific fields for middle RU of lower and upper 80 MHz when operation BW is 160 MHz as shown in 620. In yet another embodiment, as shown in 630, two unused indices in the RA LUT are used to indicate whether the middle 26 tone RU for 80 Mhz is assigned.

Common Field Format Indication

To save some overhead in HE-SIG-B common field, we can use a few bits in HE-SIG-A to indicate the format of common field. Different format (or mode) of common field means different length and definition of common field. The number of RA LUTs can be reduced with format indication. For 80 MHz operation BW, without RA LUT duplication, two common fields (on HE-SIG-B channel-1 and channel-2) each may contain one or two RA LUTs. Need two bits to indicate all the combinations. For 160 MHz operation BW, without RA LUT duplication, two common fields each may contain one, two, three, or four RA LUTs. It needs four bits to indicate all the combinations. To reduce the indication bits in HE-SIG-A, a smaller number of bits can be used to indicate a subset of the combinations. To reduce the indication bits in HE-SIG-A, a smaller number of bits can be used to indicate a subset of the combinations. With some additional indication in HE-SIG-A, the flexible signaling of resource allocation can also be supported.

FIG. 7 shows an exemplary diagram of using two bits format indication for 80 MHz operation bandwidth in accordance with embodiments of the current invention. The 2 bits format indication can be defined as:

00: 2 RA LUTs on HE-SIG-B channel 1 and 2 RA LUTs on HE-SIG-B channel 2 (2, 2)
01: 2 RA LUTs on HE-SIG-B channel 1 and 1 RA LUT on HE-SIG-B channel 2 (2, 1)
10: 1 RA LUT on HE-SIG-B channel 1 and 2 RA LUTs on HE-SIG-B channel 2 (1, 2)
11: 1 RA LUT on HE-SIG-B channel 1 and 1 RA LUT on HE-SIG-B channel 2 (1, 1)

RA 1 duplicated UT for 484 tone RU will not be on two HE-SIG-B channels. It can be flexibly placed on either channel. With two RA LUTs for 484-tone RU, an order need to be defined. For example, RA LUT signaling lower 484 tone RU shall be placed on HE-SIG-B channel 1.

FIG. 8 illustrates an exemplary block diagram of using two bits format indication for 160 MHz operation BW in accordance with embodiments of the current invention. The two bits format indication can be defined as 00: (4, 4); 01: (3, 3); 10: (2, 2); 11: (1, 1).

7-RA LUTs case: There is 1 RA LUT for 484-tone RU. Duplicate the LUT for 484-tone RU to fit the (4, 4) structure.

6-RA LUTs case: There are two RA LUTs for 484 tone RU. The LUT for lower 484 RU shall be placed on common field 1.

5-LUTs case: There will be 1) three LUTs for 484-tone RU or 2) one LUT for 996-tone RU. For 1), The LUT for lowest 484-RU shall be placed on common field-1, LUT for middle 484-tone RU shall be placed on common field-2, LUT for upper most 484-tone RU shall be duplicated. For 2), duplicate the LUT for 996 tone RU to fit the (3, 3) structure.

4-LUT case: There will be: 1) four LUTs for 484-tone RU or 2) 1 LUT for 996 tone RU and one LUT for 484-tone RU. For 1), the LUTs shall be placed in order on common field 1 and 2. From lower RU to upper RU placed on common field 1→2→1→2. For 2), the LUT for 996-tone RU and LUT for 484-tone RU shall be placed on different common field.

3-LUTs case: There are two LUTs for 484-tone RU and one LUT for 996 tone RU. The LUT for 996-tone RU shall be duplicate on two common fields. The LUTs for 484-tone RU shall be placed on two common fields in order. For example, lower 484-tone RU on common field-1.

2-LUTs case: There are two LUTs for 996-tone RU. The LUTs shall be placed on two common fields in order.

1-LUT case: There are one LUT for 2×996-tone RU. The LUT shall be duplicated on two common fields. This is MU-MIMO only case.

For STAs scheduled on RU size <=242 tone, their RA LUTs shall be found on the same 20 MHz channel as data. RA LUTs for same number of 20 MHz channels shall be placed on common field 1 and 2 in some special order. For example, place LUTs signaling lower channels to upper channels on common field 1→2→1→2 . . . . On each common field, all RA LUTs shall be placed in some given order. For example, order the RA LUTs from LUT signaling lower channel to LUT signaling upper channel. If LUT duplication is needed, duplicate the LUT for largest number of channels. If there are multiple such LUTs, duplicate the LUT for upper most channel.

FIG. 9 illustrates an exemplary block diagram of using one-bit format indication for 80 MHz operation BW in accordance with embodiments of the current invention. The exemplary of one-bit format indication includes: 0: Each common field include 2 RA LUTs (2, 2); 1: Each common field include 1 RA LUT (1, 1); For (2,1) or (1,2) case, duplicate the RA LUT for 484 tone RU.

FIG. 10 illustrates an exemplary block diagram of using one-bit format indication for 160 MHz operation BW in accordance with embodiments of the current invention. The exemplary of one-bit format indication includes: 0 indicate Each common field include 4 RA LUTs (4, 4); 1 indicate (1, 1). In another example, 0 indicate (4,4); 1 indicate (2, 2). For the cases with 5-8 RA LUTs, signal the LUTs follow the rules on slide 12. For the cases with 3-4 LUTs, follow the rules on slide 17. For 2-LUT case and 1-LUT case, duplicate to fit the (2, 2) structure.

In another embodiment, 3-bit format is used for format indication. For 80 MHz BW, reserve 1 bit and use 2 bits indication. For 160 MHz BW, three bits can indicate eight RA LUT combinations on two common fields. 000~111 indicates LUT combination (4, 4), (4,3), (3, 4), (2, 2), (2,1), (1, 2), (1, 1), (0,0). (0,0) means pure MU-MIMO case and no RA LUTs in the common fields In yet another embodiment, 4-bit format is used for format indication. For 80 MHz BW, reserve 2 bits and use 2 bits indication same as slide 15. For 160 MHz BW, 4 bits can indicate all RA LUT combinations on 2 common fields Flexible Resource Allocation Signaling The number of STAs scheduled by one RA LUT varies a lot—ranging from one to seventeen if no limitation on number of STA per 20 Mhz. Range from one to nine if number of STA for each 20 Mhz limited to nine. The number of user specific field on 2 common fields can be quite different, while the length of HE-SIG-B is the same for all channels.

FIG. 11 illustrates an exemplary block diagram for flexible resource allocation (FRA) by adding a few bits for each RA LUT in accordance with embodiments of the current invention. In one embodiment, FRA adds a few bits for each RA LUT indicating which channel the corresponding LUT is scheduling for. The format of HE-SIG-B common field is different when FRA is enabled. Additional NxM bits are needed in common fields to support FRA. N is the number of RA LUTs in the common field and M is the number of bits for signaling the channel index. In some scenarios, FRA is not needed and common field can save the additional bits. In one novel aspect, one bit is added in HE-SIG-A to enable/disable the FRA feature.

FIG. 12 illustrates an exemplary block diagram for flexible resource allocation (FRA) by allowing placing the user specific field of a STA on different channel from the RA LUT signaling it in accordance with embodiments of the current invention. In one embodiment, to enable FRA signaling is to allow placing the user specific field of a STA on different channel from the RA LUT signaling it. It needs to define some rules for placing the user specific field to balance the load. STAs scheduled by one RA LUT need to be placed in order. Sets of STAs scheduled by ordered RA LUTs are also need to be placed in same order as LUTs.

Figure 14:
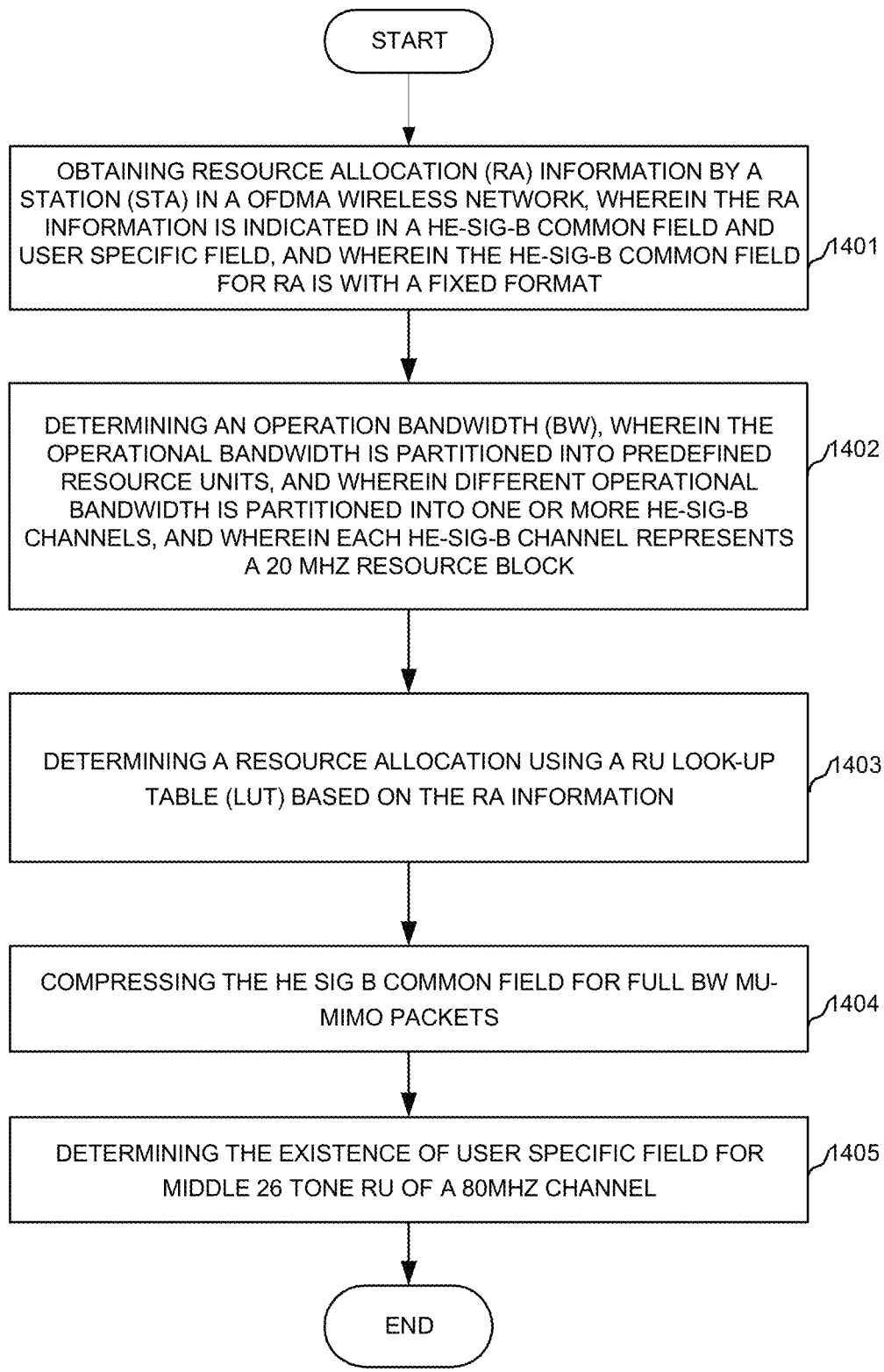
FIG. 14 shows an exemplary flow chart of obtaining resource units information with HE-SIG-B common field with fixed format and indication in accordance with embodiments of the current invention.

FIG. 13 illustrates an exemplary block diagram of using one-bit FRA indication in HE-SIG-A to enable/disable the flexible resource-allocation signaling feature in accordance with embodiments of the current invention. With FRA-enable bit and common-field format indication bits, the length of HE-SIG-B can be calculated after HE-SIG-B common field is decoded. Length of HE-SIG-B field bits in HE-SIG-A may not be needed. Therefore indication FRA and common field format in HE-SIG-A may not bring any additional overhead FIG. 14 shows an exemplary flow chart of obtaining resource units information with HE-SIG-B common field with fixed format and indication in accordance with embodiments of the current invention. At step 1401, the STA obtains resource allocation (RA) information in an OFDMA wireless network, wherein the RA information is indicated in a HE-SIG-B common field, and wherein the HE-SIG-B common field for RA is with a fixed format. At step 1402, the STA determines an operation bandwidth, wherein the operation bandwidth is partitioned into predefined resource units, and wherein different operation bandwidth is partitioned into one or more HE-SIG-B channels, and wherein each HE-SIG-B channel represents a 20 MHz resource block. At step 1403, the STA determines a resource allocation using a RA look-up table (LUT) based on the RA information. At step 1403, the STA determines a resource allocation using a RU look-up table (LUT) based on the RA information. At step 1404, the STA compresses the HE-SIG-B common field for full BW MU-MIMO packets. At step 1405, the STA determines the existence of user specific field for middle 26 tone RU of an 80 Mhz channel.

Although the present invention has been described in connection with certain specific embodiments for instructional purposes, the present invention is not limited thereto. For example, although an LTE-advanced mobile communication system is exemplified to describe the present invention, the present invention can be similarly applied to other mobile communication systems, such as Time Division Synchronous Code Division Multiple Access (TD-SCDMA) systems. Accordingly, various modifications, adaptations, and combinations of various features of the described embodiments can be practiced without departing from the scope of the invention as set forth in the claims.

What is claimed is:

1. A method, comprising:
   (a) obtaining resource allocation (RA) information by an orthogonal frequency division multiple access wireless radio station (STA) in a wireless network, wherein the RA information is indicated in a HE-SIG-B common field and a user specific field, and wherein the HE-SIG-B common field is a fixed format;
   (b) determining an operation bandwidth (BW), wherein the operation bandwidth is partitioned into predefined resource units, and wherein different operation bandwidths are partitioned into one or more HE-SIG-B channels, and wherein each HE-SIG-B channel represents a resource block of a first frequency;
   (c) determining a resource allocation using an RU look-up table (LUT) based on the RA information;
   (d) compressing the HE-SIG-B common field for full BW MU-MIMO packets; and
   (e) determining the existence of a user specific field for middle 26 tone RU of a channel of a second frequency, wherein the HE-SIG-B common field comprises a one-bit middle RU indicator indicating whether the middle 26 tone RU of an 80 Mhz is allocated;
   (f) communicating using the STA in accordance with the RA information.

2. The method of claim 1, further comprising: determining a resource unit (RU) size scheduled for the STA and wherein the determining of the resource allocation in (c) is further based on the RU size.

3. The method of claim 1, wherein the HE-SIG-B common field is defined with the fixed format of one RU LUT for 20 MHz operation bandwidth, with one RU LUT on each HE-SIB-B channels for 40 MHz operation bandwidth, with two HE-SIG-B common field for 80 MHz operation bandwidth with two HE-SIG-B channels, and with four RU LUTs on each HE-SIG-B common field for 160 MHz operation bandwidth with two HE-SIG-B channels, and wherein for each HE-SIG-B common field, the RU LUTS are placed in an order of channel indices signaled in each corresponding RU LUT.

4. The method of claim 3, wherein RA LUTs are placed in an order of corresponding channel index from lower channel to upper channel.

5. The method of claim 3, wherein the operation bandwidth is greater than 20 MHz, and wherein HE-SIB-B channel 1 is duplicated on all odd numbered 20 Mhz channels and wherein HE-SIB-B channel 2 is duplicated on all even numbered 20 Mhz channels.

6. The method of claim 3, wherein RA LUTs on HE-SIG-B channel 1 contain RA information for all RUs whose subcarrier indices overlap odd numbered 20 Mhz channels and wherein RU LUTs on HE-SIG-B channel 2 contain RA information for all RUs whose subcarrier indices overlap even numbered 20 Mhz channels.

7. The method of claim 1, wherein a full BW MU-MIMO is configured for the entire operation bandwidth, and wherein a one-bit compression indicator is set in a HE-SIG-A field indicating a saving of the HE-SIG-B common field.

8. The method of claim 1, wherein the operation bandwidth is 80 MHz and the one-bit middle RU indicator is duplicated on a common field of both HE-SIG-B channels.

9. The method of claim 1, wherein the operation bandwidth is 80 MHz and the middle RU indicator is set to 1, and wherein the user specific field for the middle 26 tone RU of 80 Mhz channel is placed on a fixed HE-SIG-B channel.

10. The method of claim 1, wherein the operation bandwidth is 80 MHz and the middle RU indicator is set to 1, and wherein the user specific field for the middle 26 tone RU of 80 Mhz channel is placed on HE-SIG-B channel with smaller number of signaling bits.

11. The method of claim 1, wherein the operation bandwidth is 160 MHz, and wherein the middle RU indicator for middle 26 tone RU of lower 80 MHz is included in a common field of HE-SIG-B channel 1 and the middle RU indicator for middle 26 tone RU of upper 80 MHz is included in a common field of HE-SIG-B channel 2.

12. The method of claim 1, wherein the operation bandwidth is 160 MHz, and wherein the user specific field for middle 26 tone RU of lower 80 MHz is placed at an end of HE-SIG-B channel 1 and the user specific field of middle 26 tone RU of upper 80 MHz is placed at the end of HE-SIG-B channel 2.

13. A station (STA), comprising:
an orthogonal frequency division multiple access wireless radio frequency (RF) transceiver that transmits and receives wireless signals in a wireless network based on resource allocation (RA) information;
an HE-SIG-B decoding circuit operable to obtain the RA information by a station (STA) in a wireless network, wherein the RA information is indicated in an HE-SIG-B common field and a user specific field, and wherein the HE-SIG-B common field is a fixed format;
a bandwidth detection circuit operable to determine an operation bandwidth, wherein the operation bandwidth is partitioned into predefined resource units, and wherein different operation bandwidths are partitioned into one or more HE-SIG-B channels, and wherein each HE-SIG-B channel represents a 20 MHz resource block;
a resource allocation circuit operable to determine a resource allocation using an RA look-up table (LUT) based on the RA information;
a common field compressing circuit operable to compress the HE-SIG-B common field for full BW MU-MIMO packets; and
a middle RU handling circuit operable to determine the existence of a user specific field for middle 26 tone RU of a 80 Mhz channel.

14. The STA of claim 13, further comprising: a RU size detecting circuit operable to determine a resource unit (RU) size scheduled for the STA and to determine the resource allocation further based on the RU size.

15. The STA of claim 13, wherein the HE-SIG-B common field is defined with the fixed format of one RU LUT for 20 MHz operation bandwidth, with one RU LUT on each HE-SIB-B channels for 40 MHz operation bandwidth with two HE-SIG-B channels, with two RU LUTs on each HE-SIG-B common field for 80 MHz operation bandwidth with two HE-SIG-B channels, and with four RU LUTs on each HE-SIG-B common field for 160 MHz operation bandwidth with two HE-SIG-B channels, and wherein for each HE-SIG-B common field, the RU LUTs are placed in an order of channel indices signaled in each corresponding RU LUT.

16. The STA of claim 15, wherein RA LUTs are placed in an order of corresponding channel index from lower channel to upper channel.

17. The STA of claim 15, wherein the operation bandwidth is greater than 20 MHz, and wherein HE-SIB-B channel 1 is duplicated on all odd numbered 20 MHz channels and HE-SIB-B channel 2 is duplicated on all even numbered 20 MHz channels.

18. The STA of claim 15, wherein RU LUTs on HE-SIG-B channel 1 contain RA information for all RUs whose subcarrier indices overlap odd numbered 20 MHz channels and wherein RU LUTs on HE-SIG-B channel 2 contains RA information for ALL RUs whose subcarrier indices overlap even numbered 20 MHz channels.

19. The STA of claim 13, wherein a full BW MU-MIMO is configured for an entire operation bandwidth, and wherein a one-bit compression indicator is set in an HE-SIG-A field indicating a saving of the HE-SIG-B common field.

20. The STA of claim 13, wherein a one-bit middle RU indicator is included in the HE-SIG-B a common field indicating whether the middle 26 tone RU of an 80 Mhz is allocated.

21. The STA of claim 20, wherein the operation bandwidth is 80 MHz and the 1 bit middle RU indicator is duplicated on a common field of both HE-SIG-B channels.

22. The STA of claim 20, wherein the operation bandwidth is 80 MHz and the middle RU indicator is set to 1, and wherein the user specific field for the middle 26 tone RU of 80 Mhz channel is placed on a fixed HE-SIG-B channel.

23. The STA of claim 20, wherein the operation bandwidth is 80 MHz and the middle RU indicator is set to 1, and wherein the user specific field for the middle 26 tone RU of 80 Mhz channel is placed on HE-SIG-B channel with a smaller number of signaling bits.

24. The STA of claim 20, wherein the operation bandwidth is 160 MHz, and wherein the middle RU indicator for middle 26 tone RU of lower 80 MHz is included in a common field of HE-SIG-B channel 1 and wherein the middle RU indicator for middle 26 tone RU of upper 80 MHz is included in a common field of HE-SIG-B channel 2.

25. The STA of claim 20, wherein the operation bandwidth is 160 MHz, and wherein the user specific field for middle 26 tone RU of lower 80 MHz is placed at an end of HE-SIG-B channel 1 and wherein the user specific field of middle 26 tone RU of upper 80 MHz is placed at an end of HE-SIG-B channel 2.

\* \* \* \* \*